US008862173B2

(12) United States Patent
Marocchi et al.

(10) Patent No.: US 8,862,173 B2
(45) Date of Patent: Oct. 14, 2014

(54) METHOD FOR SELECTING MEDIA FOR DELIVERY TO USERS AT AN INCIDENT (75) Inventors: James A. Marocchi, Winfield, IL (US); John E. Emrich, Bartlett, IL (US); John C. Kay, Elgin, IL (US); Daniel J. Naylor, Inverness, IL (US); Hemang F. Patel, Hoffman Estates, IL (US); Marianne J. Stanke, Elmhurst, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 886 days.

(21) Appl. No.: 12/635,281

(22) Filed: Dec. 10, 2009

(65) Prior Publication Data
US 2011/0143651 A1 Jun. 16, 2011

(51) Int. Cl.
*H04M 3/42* (2006.01)
*H04B 7/00* (2006.01)
(Continued)

(52) U.S. Cl.
CPC ............. *H04L 65/1076* (2013.01); *H04W 4/18* (2013.01); *H04L 67/2838* (2013.01); *G08B 27/006* (2013.01); *H04L 65/1069* (2013.01); *H04L 65/103* (2013.01); *H04L 67/2828* (2013.01); *H04L 65/1089* (2013.01)
USPC ........ 455/519; 455/414.1; 455/518; 455/521; 340/539.11; 348/157; 370/338; 370/352; 370/466; 705/14.2; 709/218; 709/223; 715/202; 725/9; 725/14; 725/62

(58) Field of Classification Search
CPC ............ H04L 12/583; H04L 29/06027; H04L 65/607; H04L 47/806; H04L 47/822; H04L 47/828; H04L 65/4061; H04L 65/4076; H04W 4/10; H04W 4/18; H04W 4/22; H04W 28/18; H04W 36/0033; H04W 36/12; H04W 36/14; H04W 48/18; H04W 72/005; H04W 76/005; H04W 76/007; H04W 88/06; G06F 9/542; G06F 17/30056; H04B 7/0613; H04B 17/0077; H04M 1/274516; H04M 1/27455; H04M 11/04
USPC .............. 455/3.01, 3.06, 404.1, 404.2, 414.1, 455/435.2, 518, 519, 521; 340/506, 539.11, 340/539.12; 705/14.2, 325; 709/218, 224; 715/201, 202, 739; 725/9, 16, 62, 135, 725/201, 202
See application file for complete search history.

(56) References Cited

U.S. PATENT DOCUMENTS 6,366,782 B1 * 4/2002 Fumarolo et al. ............. 455/457
7,026,926 B1 4/2006 Walker, III
(Continued)

FOREIGN PATENT DOCUMENTS

| EP | 1526682 A2 | 4/2005 |
| EP | 1571842 A1 | 9/2005 |
| EP | 1613105 A1 | 1/2006 |

OTHER PUBLICATIONS

PCT International Search Report Dated Feb. 23, 2011.

*Primary Examiner* — Yuwen Pan
*Assistant Examiner* — Paul P Tran
(74) *Attorney, Agent, or Firm* — Valerie M. Davis; Kenneth A. Haas (57) ABSTRACT A media selection and insertion control device implements a method for selecting media for delivery to a plurality of users at an incident. The media selection and insertion control device: receives a plurality of media inputs from multiple media sources; receives capabilities of devices of users at an incident; receives resource capabilities of a set of networks to which the users are communicatively coupled; receives a set of incident-based rules and applies these rules to the plurality of media inputs to select media inputs to deliver to the users; and determines a mode of delivering the selected media inputs to the users based at least on the capabilities of the users' devices and on the resource capabilities of the set of networks to which the users are communicatively coupled.

15 Claims, 6 Drawing Sheets (51) Int. Cl.

| | | |
|---|---|---|
| *G08B 1/08* | (2006.01) | |
| *H04N 7/18* | (2006.01) | |
| *H04W 4/00* | (2009.01) | |
| *H04L 12/66* | (2006.01) | |
| *H04J 3/16* | (2006.01) | |
| *H04J 3/22* | (2006.01) | |
| *G06Q 30/00* | (2012.01) | |
| *G06F 15/16* | (2006.01) | |
| *G06F 15/173* | (2006.01) | |
| *G06F 17/00* | (2006.01) | |
| *G06F 17/20* | (2006.01) | |
| *G06F 17/21* | (2006.01) | |
| *G06F 17/22* | (2006.01) | |
| *G06F 17/24* | (2006.01) | |
| *G06F 17/25* | (2006.01) | |
| *G06F 17/26* | (2006.01) | |
| *G06F 17/27* | (2006.01) | |
| *G06F 17/28* | (2006.01) | |
| *H04H 60/33* | (2008.01) | |
| *H04H 60/32* | (2008.01) | |
| *H04N 7/16* | (2011.01) | |
| *H04W 4/18* | (2009.01) | |
| *H04L 29/08* | (2006.01) | |
| *H04L 29/06* | (2006.01) | |
| *G08B 27/00* | (2006.01) | |

(56) References Cited

U.S. PATENT DOCUMENTS

| | | |
|---|---|---|
| 7,233,781 B2 | 6/2007 | Hunter |
| 7,289,786 B2 | 10/2007 | Krasner |
| 7,298,833 B2 | 11/2007 | Klein |
| 7,301,451 B2 | 11/2007 | Hastings |
| 7,302,481 B1 | 11/2007 | Wilson |
| 7,343,302 B2 | 3/2008 | Aratow |
| 8,209,729 B2 * | 6/2012 | Phillips et al. .................. 725/87 |
| 2001/0043594 A1 * | 11/2001 | Ogawa et al. .................. 370/356 |
| 2003/0069997 A1 * | 4/2003 | Bravin et al. .................. 709/250 |
| 2003/0100326 A1 * | 5/2003 | Grube et al. .................. 455/515 |
| 2004/0070515 A1 * | 4/2004 | Burkley et al. .......... 340/825.49 |
| 2004/0267865 A1 * | 12/2004 | Cuervo ........................ 709/200 |
| 2005/0219044 A1 | 10/2005 | Douglass |
| 2005/0278731 A1 * | 12/2005 | Cameron et al. ................ 725/14 |
| 2008/0037461 A1 * | 2/2008 | Biltz et al. .................... 370/328 |
| 2008/0198422 A1 * | 8/2008 | Casey et al. .................. 358/425 |
| 2008/0263196 A1 | 10/2008 | Kansal et al. |
| 2008/0280637 A1 * | 11/2008 | Shaffer et al. ................. 455/519 |
| 2009/0156209 A1 | 6/2009 | Franklin et al. |

\* cited by examiner

METHOD FOR SELECTING MEDIA FOR DELIVERY TO USERS AT AN INCIDENT

FIELD OF THE DISCLOSURE

The present disclosure relates generally to a communication system and more particularly relates to selecting media for delivery to a plurality of users at an incident.

BACKGROUND

In an event, such as an emergency situation or service request (also referred to herein as an incident), responding workers and resources from various agencies (e.g., police, fire fighters, utility workers, transportation vehicles, military personnel, etc.) may be called in to address the situation, wherein an agency is a public or private group whose responsibility it is to respond to incidents. Moreover, it is further known that different event responder resources may use different communication networks such as, for instance, different private radio networks or may use different communication means such as voice talk groups, multimedia data groups, etc. The communication networks can also vary in resource availability based upon multiple factors including, but not limited to, network load, bandwidth partitioning, priority, as well as the geographical location of the user. Moreover, the different responders may further use devices having varying capabilities (e.g., video, audio only, data, etc.).

During the event, there is a need to dynamically identify resources, relevant content, and proper communication links with groups that need to participate in the event related activity. To save lives, prevent disasters, and protect their workforce, first responders require information related to an incident quickly, accurately, and succinctly. Recent technological changes have provided a growing number of media sources that can be used to deliver relevant information to first responders. While more information is available, it may not be fully used since many devices have limitations on the types of media supported, thus limiting the types of media that can be delivered to key responders.

Therefore, there exists a need for a method to select and deliver media, from a plurality of media inputs, to users having devices of various capabilities across one or more networks having varying resource capabilities.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate various embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to various embodiments a method for selecting and distributing media to a plurality of users at an incident is described. Various types of media inputs are analyzed, along with incident attributes to determine what information is to be delivered to the responding group. Once a set of media inputs has been selected for delivery to users at the incident, it is essential that as much of this information as is feasible is provided to the users so that the appropriate response to the incident is determined. To this end, conversion or reformatting capabilities may be used to determine options for delivering the selected media to one or more groups. Decision inputs that are considered include the capabilities of the first responders' devices, the capabilities of the delivery network(s), as well as existing group sessions which could be used for media delivery.

Once the responders' devices and network capabilities have been determined, this information is used to determine whether an existing group session can be utilized to deliver the selected media inputs, or if a new, dynamic group should be generated and used. Media content may be reformatted to match the capabilities of the group session, including reformatting the media to lower bandwidth, text to speech translations, etc. Moreover, as the incident unfolds, network bandwidth availability is monitored to determine if further modification of the content being delivered is required to match the available network bandwidth in order to continue delivering the selected media to the responders.

If a selected group session has high utilization (e.g., the floor is occupied for much of the session), a user or users may be preempted within the group session (e.g., on a specified priority basis) to provide timely delivery of the selected media inputs to critical users. Alternatively, if there is a silence period within the group session of a particular duration, the media insertion can be performed during that silence period. Also, either proactive or reactive initiation of media delivery into the group session may be implemented. In a proactive model, a policy driven decision is made to deliver specified media to the responding group. This may be driven by agency policy, or policy determined by the type of incident. In a reactive model, specific initiation of media delivery is performed through human instruction (e.g., voice instruction). This initiation can be from dispatch or from field responders.

The above features allow for timely and situation relevant delivery of information to first responders at an incident, which incorporates factors including the type of incident, as well as the availability of different types of media needing to be delivered, and the device and network characteristics utilized by the first responders. Those skilled in the art will realize that the above recognized advantages and other advantages described herein are merely illustrative and are not meant to be a complete rendering of all of the advantages of the various embodiments.

Figure 1:
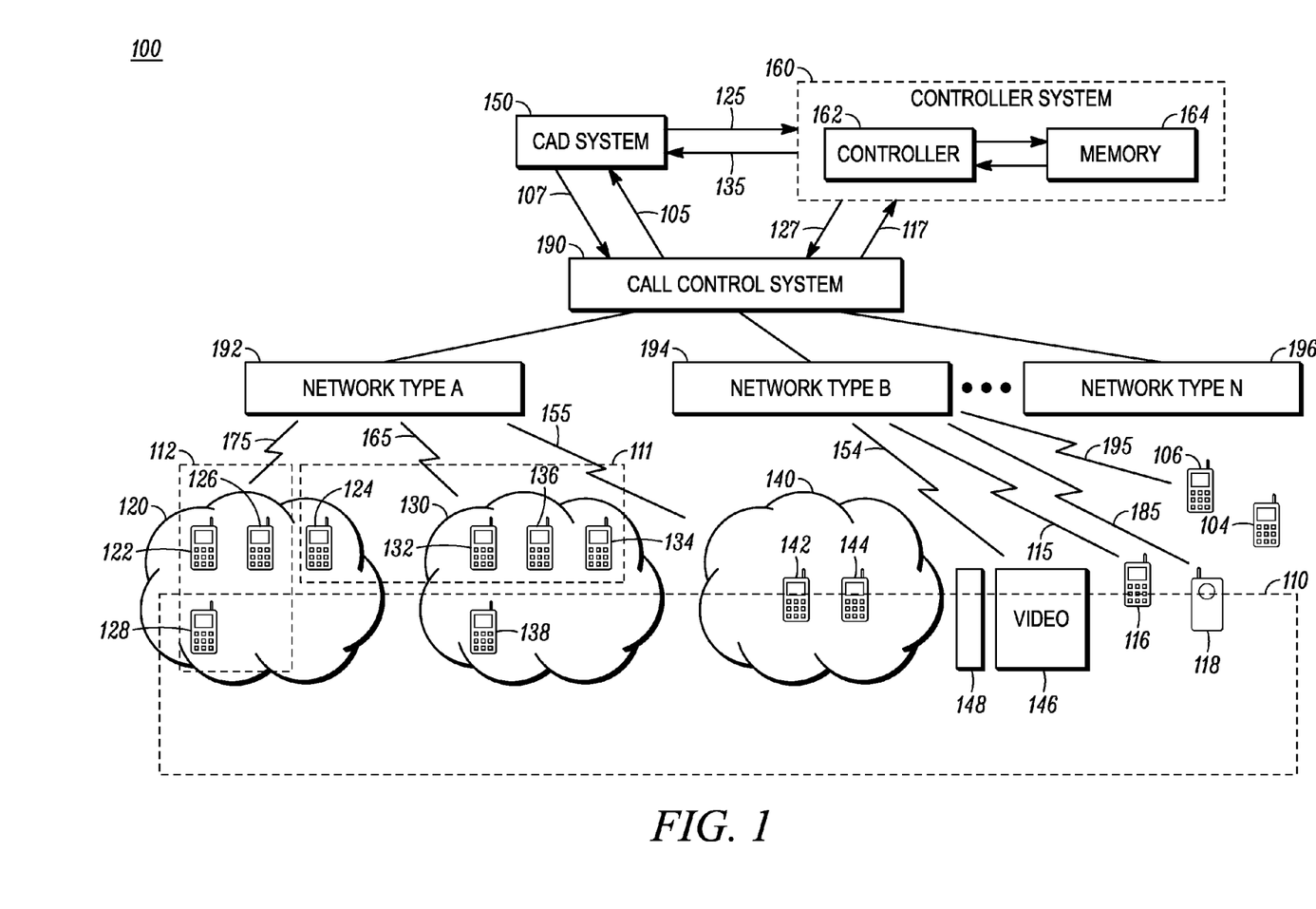
FIG. 1 is a system diagram of a communication system implementing methods in accordance with some embodiments.

FIG. 1 illustrates a diagram of a communication system 100 in accordance with some embodiments. For purposes of the teachings herein, a work group is defined as resources assigned by a resource manager (also referred to herein as a resource management entity) for a particular event and can include resources such as personnel, sensors, cameras, vehicles, content sources (e.g., databases) and other non-network resources needed to respond to an event. A resource management entity upon learning of an event generates a "state" or various information related to the event and enables formation of one or more work groups for the event. The resource management entity in the following description is referred to as a Computer Aided Dispatch (CAD) system. However, alternative embodiments of a resource management entity include, but are not limited to, a work order management system or customer service system to name a few.

In addition, a communication group (also referred to herein as a session) is defined by the entities (which can include devices used by all or portions of the assigned work groups) and network resources (e.g., RF resources) that are set up and utilized by members of the work groups for the purposes of transporting information related to the event. The communication group can take many forms such as a voice group, a data group, a multimedia group, a teleconference, etc. Communication groups are formed and selected media inputs are provided to those groups within the bounds of resource availability as described in more detail below by reference to some embodiments.

Turning back to the details of FIG. 1, the communication system 100 includes a controller system 160, a resource management entity (in this case a CAD system) 150, and a call control system 190. The call control system 190 comprises one or more call controlling functions that provides coordination of communication (e.g., voice "calls", media exchange, such as video, data, etc.) between members of a communication group. The communication system 100 further includes a number of networks, including a Network Type A 192, a Network Type B 194 through a Network type N 196 having one or more infrastructure devices that serve as an intermediary for communications between the devices used by the resources of the various work groups in the system. Accordingly, the networks can include, but are not limited to, equipment commonly referred to as zone controllers, base station controllers, repeaters, base radios, base stations, base transceiver stations, access points, routers or any other type of infrastructure equipment interfacing a communication device or content source in a wireless or wireline environment.

Moreover, the networks can be configured as a 2G, 3G, or 4G network using communication technologies including, but not limited to, Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Single Carrier Frequency Division Multiple Access (SC-FDMA), Discrete Fourier Transform-Spread Orthogonal Frequency Division Multiplexing (DFT-SOFDM), Interleaved Frequency-Division Multiple Access (IFDMA), Worldwide Interoperability for Microwave Access (WiMax), Long-Term Evolution (LTE). These wireless communication technologies enable the utilization of applications including, for example Push to Talk (PTT, i.e., for communicating voice), Push to Talk over Cellular (PoC), Push to X (PTX, i.e., for communicating voice and/or other media such as images or video) and other communication technologies. Such networks may include trunked networks (wherein there is sharing of network resources that are distributed using a central controller), conventional networks having dedicated resources, or "traditional" public safety networks such as, for instance, P25 networks, TETRA networks, etc.

Turning again to FIG. 1, system 100 further includes a plurality of groups 120, 130, 140 comprising multiple communication devices that are used by members of work groups assigned by the CAD system 150, and dynamic communication groups 110, 111, and 112 that are formed for delivery of certain of the selected media content when the existing groups are not suitable for enabling delivery of the selected media inputs to the users needing the media content. Also shown is a plurality of communication entities, which include a number of wireless communication devices and a remote input device 118 (such as a remote sensor, a camera, or a database) shown communicatively coupled, through Network Type B 194 via a communication link 185, to call control system 190 for communicating with the CAD system 150, the controller 162, and/or other entities in the network.

Furthermore, wireless communication devices 104, 106 are shown communicatively coupled, through Network Type B 194 via a communication link 195, to the call control system 190 for communicating with the CAD system 150, the controller 162, and/or other entities in the network. A wireless communication device 116 is shown communicatively coupled, through Network Type B 194 via a communication link 115, to call control system 190 for communicating with the CAD system 150, the controller 162, and/or other entities in the network. Wireless communication devices 122, 124, 126, 128, 132, 134, 136, 138, 142, 144 are shown communicatively coupled, through Network Type A 192 via communication links 175 and 165, to the call control system 190 for communicating with the CAD system 150, the controller 162, and/or other entities in the network. Wireless communication devices 146 and 148 are shown communicatively coupled, through Network Type B 194 via communication link 154, for communicating with the CAD system 150, the controller 162, and/or other entities in the network. Some of the entities are included in one or more of the groups 110, 111, 112, 120, 130, and 140, and some of the entities are standalone units that may be, for example, used by public safety personnel to respond to other events.

The CAD system 150 communicates with the control system 190 via communication links 105 and 107 and communicates with the controller system 160 via communication links 125 and 135. The controller system 160 further communicates with the call control system 190 via communication links 117 and 127. As used herein, communication links are the physical resources over which information is sent between the devices within system 100 and can comprise wired links or wireless links. If the communication links comprise wireless links, the corresponding physical resource is an allocation of radio spectrum that is partitioned into radio frequency (RF) carriers that are modulated by information comprising a control stream or a media stream (also referred to herein as content), which can include for example, data, voice (audio), video, etc.

The controller system 160, CAD system 150, and the call control system 190 are illustratively shown as separate physical entities. However, depending on the particular implementation scenario one or more of these systems may be physically co-located or consist of multiple physical elements. The controller system 160 may be integrated with a resource management application (e.g., in system 150), the call control system 190, some other entity (such as a Gateway) or some combination of these devices, or may be a separate entity, such as a message switch. The resource management application may be a CAD application, typically used by public safety, transportation, and military organizations; a work order management application, typically used by field service personnel and government service organizations; or other resource management application. The call control system 190 may be a zone controller as part of a land mobile radio system, a call processing server such as PTT over cellular server used as part of a cellular carrier system, a video communication controller, or other communication system controller. The call control system 190 may consist of multiple call controllers used to control a variety of network and communication types.

The controller system 160 includes a memory 164 communicatively coupled to a controller 162, which comprises one or more processors coupled, for example, via a wired (e.g., serial cable) connection to the call control system 190 and the CAD system 150. Further, in one embodiment, memory 164 can be at least partially physically co-located with the controller 162. However, in another embodiment memory 164 can be at least partially positioned external to the controller system 160 at a different location as part of a database and may be connected to the controller 162 via a suitable communication link. Therefore, memory 164 may comprise a single physical memory element in one physical location or multiple memory elements in one or more physical locations. Memory 164 stores a set of incident-based rules and stores any combination of device characteristics parameters, user characteristics parameters, and network characteristics parameters that indicate resource availability such as, for instance, manpower availability, RF resource availability, and device resource availability. The set of incident-based rules comprises, for example, one or more algorithms utilized by the processor within controller 162 to determine whether an incident exists, to select media inputs for distribution to users (e.g., responders) at an incident, to determine resources (e.g., network resources, group sessions, etc.) to use in distributing the media, to determine a suitable format for distributing the selected media content, and the like.

The entities 104, 106, 116, 118, 122-128, 132-138, and 142-148 are located at different positions in the communication system 100. Each of these entities establishes a communication link for communicating information (which can include voice, data, video, control information, etc.) across the networks 192, 194, 196, utilizing the call control system 190, which in turn transports said information to the controller system 160, and/or to the CAD system 150. The entities communicate with one another and/or with the controller system 160 and/or the CAD system 150 across the networks 192, 194, 196, utilizing the call control system 190. The call control system 190 and networks 192, 194, 196 configurations depend on the communication protocols used in the system.

Entities in the communication system 100 can include physical devices such as: one or more sensors used to measure various parameters in the system such as temperature, humidity, toxin levels, etc.; a video, a still picture camera, or a database. In addition, some entities in the system are communication entities or wireless communication devices also commonly referred to as a radio, a mobile station, a subscriber unit, a PDA, a cell phone, a laptop or any similar device that can transmit and receive information bearing signals.

The wireless entities are configured to operate according to one or more different 2G, 3G and 4G wireless communication technologies depending on the particular network through which the entity communicates. In one embodiment, the entities are configured to transmit/receive communication content from one network to another network, which may be of the same or a different type. For example, communication content may be transmitted from a LAN (local area network) to a GSM network. In another embodiment, the entities may communicate with each other using short range technology. Examples of short range RF technology include Bluetooth, Wi-Fi, Zigbee and similar protocols. Accordingly, the entities and the networks 192, 194, 196 wirelessly communicating with those entities have over-the-air interfaces such as 802.11 or Evolved UMTS Terrestrial Radio Access Network (E-UTRAN) and further include a physical transceiver, i.e., transmitter and receiver apparatus (not shown), as part of the wireless interface used to transmit and receive information in the network. The transceiver, memory and processors can have any suitable physical implementation and are topologically coupled depending on the particular device implementation.

As illustrated, the groups 140, 130, 120 each comprise a group of entities that form respective communications groups or sessions. Each group 120, 130, 140 may comprise, for instance, the subscriber units used by members of a talkgroup, with each talkgroup being associated with a different first responder team (e.g., police, fire department, hospital personnel) depending on the type of event. In this illustrative embodiment, group 120 includes entities 122 to 128; group 130 includes entities 132 to 138; and group 140 includes entities 142 and 144. The entities within a group (e.g., 120, 130, 140) may directly communicate with each other or have media content pushed to members of the group, in accordance with the teachings herein, that is needed to make decisions during the incident. As further illustrated, entities from one or more groups can be a part of one or more communication groups formed in accordance with some embodiments for the content distribution by the controller system. For example, as shown in FIG. 1, entities 128, 138, 142, 144, from the groups 120, 130, 140 are selected to, in part, form the communication group 110. Additional entities 116, 118, 146, and 148 are selected to form the communication group 110.

Figure 2:
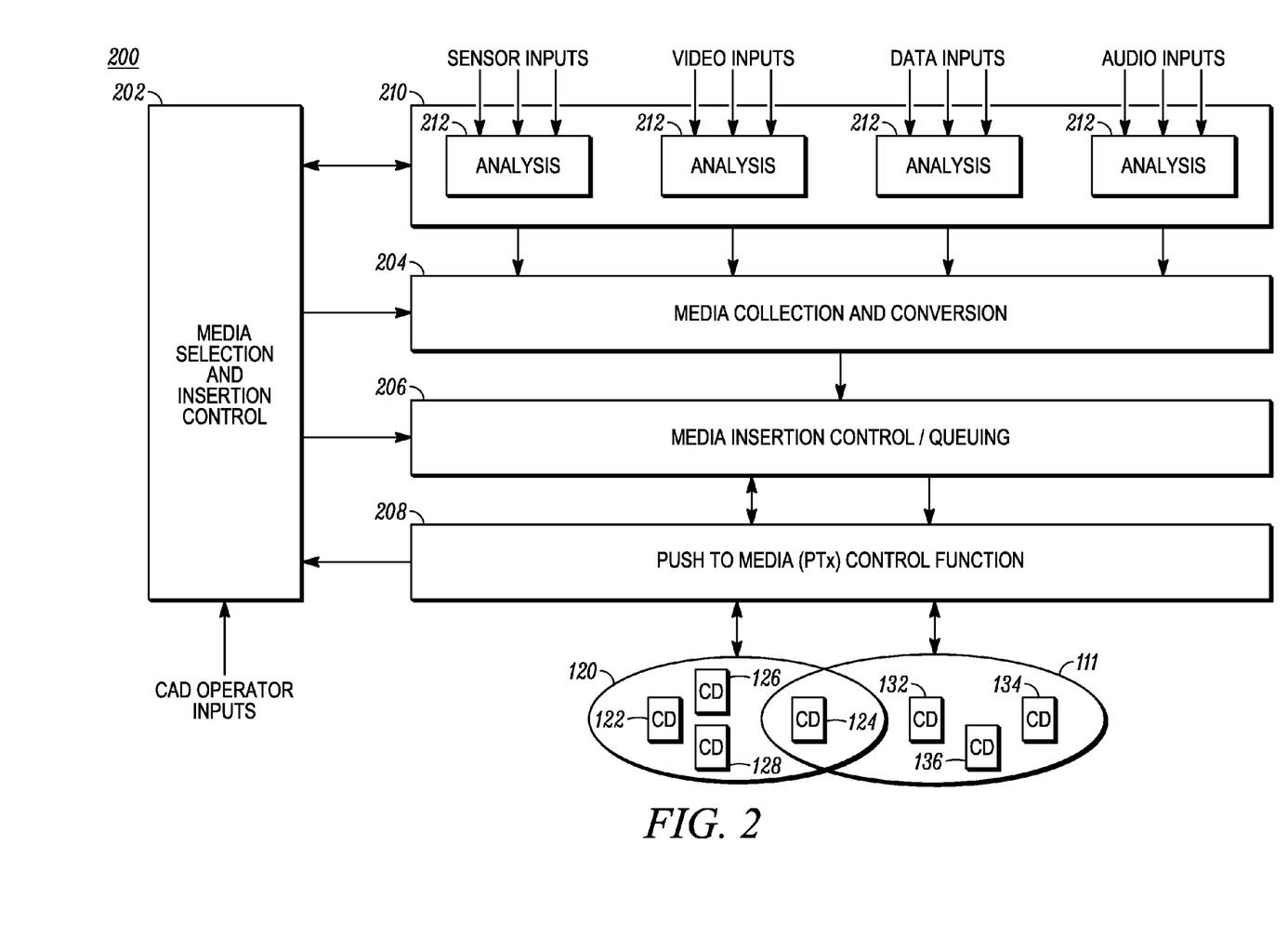
FIG. 2 is a block diagram of an embodiment of controller apparatus shown in FIG. 1.

Turning again to controller system 160, the controller 162 comprises a number of logical functions (implemented by one or more programmed processors in one or more physical devices) for selecting various media inputs for distribution to users at an incident. FIG. 2 provides an illustrative implementation 200 of a group of logical functions that may comprise controller 162. These logical functions 200 include an analysis block 210 containing various analysis functions 212, a media selection and insertion control function 202 in accordance with embodiments of the teachings herein (with the device or devices that includes function 202 being collectively termed a "media selection and insertion control device"), a media collection and conversion function 204, a media insertion control/queuing function 206 in accordance with embodiments of the teachings herein, and a Push to Media (PTX) control function 208.

Figure 3:
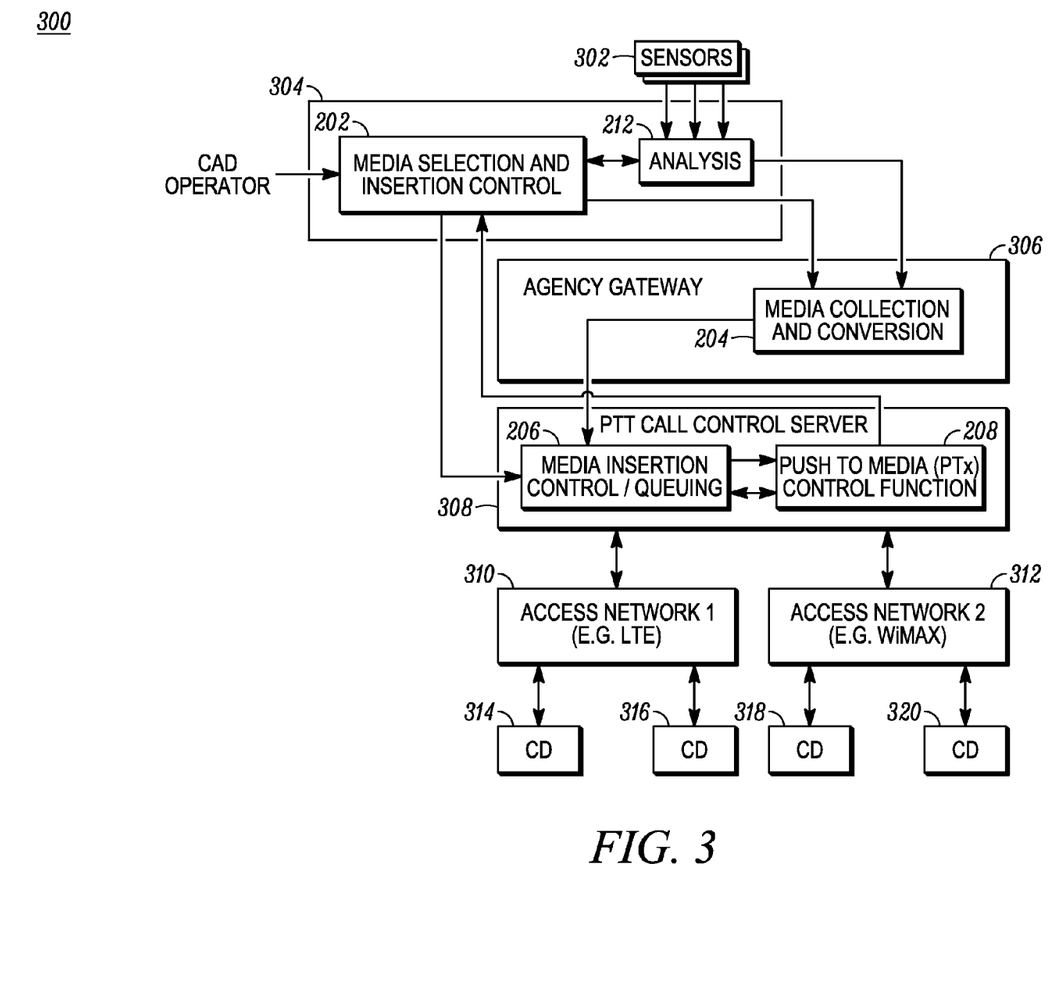
FIG. 3 is a block diagram of an embodiment of the controller apparatus of FIG. 2 being implemented in a communication system.

FIG. 3 illustrates how these various functions can be implemented in a communication system 300, such as might be implemented within system 100 in FIG. 1. It should be noted that this implementation is in no way meant to be limiting but merely provides on example of how the functions shown in FIG. 2 can be incorporated into a communication system. In this illustrative implementation, system 300 includes sensors 302, a Computer Aided Dispatch (CAD) center 304, an agency gateway 306, a PTT call control server 308, networks 310 and 312, and communication devices (CDs) 314, 316, 318, and 320.

The media selection and insertion control function 202 and analysis functions 212 are included in the CAD center 304, wherein inputs from the sensors 302 are provided to the analysis functions 212 to gate which of these inputs are provided to the media selection and insertion control function 202 (which also received inputs from a CAD operator as described in more detail below by reference to FIG. 2 and FIGS. 4-6. The media collection and conversion function 204 is included in the agency gateway 306. The agency gateway provides an interface between an agency's Enterprise network and the radio access networks (RANs) and enables agencies to operate without having to have specific RAT (Radio Access Technology) or specific knowledge in managing information and users for an incident. The media insertion control/queuing function 206 and PTX control function 208 are included in the PTT call control server 308, wherein the selected and appropriately formatted media input is pushed via the access networks 1 and 2 (e.g., LTE 310, and WiMAX 312 networks, respectively) to the subscriber units 314, 316, 318, and 320 in accordance with embodiments described by reference to FIG. 2 and FIGS. 4-6.

We now return to FIG. 2 for a detailed description of the logic functions contained therein. Each analysis function 212 receives a different type of media input, which in this illustrative case includes various sensor inputs (e.g., medical, weather, toxin level, etc), video inputs (e.g., images), data inputs (e.g., text), and audio input (e.g., from microphones), and uses pre-stored decision logic to analyze the respective media inputs to determine the media inputs to provide to the media selection and insertion control function 202. For example, the analysis function for the sensor inputs may include a number of thresholds for comparing temperature, toxin levels, etc., measured by the sensors to determine when the sensor inputs are provide to the media selection and insertion control media function 202. Sensor inputs may be generated autonomously by the sensors or may be provided by the sensors as a result of a query from users.

The analysis function for the video inputs may include, but is not limited to, such features as license plate recognition, facial recognition, etc., used as a basis for providing video inputs and metadata associated with these inputs to the media selection and insertion control function 202. The analysis function for the audio inputs may include, but is not limited to, voice recognition, analytics to determine a gunshot sounds, etc., used as a basis for providing audio inputs and metadata associated with these inputs to the media selection and insertion control function 202. Further analytics within the analysis functions 212 may provide to the media selection and insertion control function 202 various other metadata associated with the media inputs such as, for instance, type of sensor, media source type, time and date associated with media inputs, media source name, location of sensor, threshold of sensor information, yes/no on sensor trip, source operational status, time of day, etc.

Figure 4:
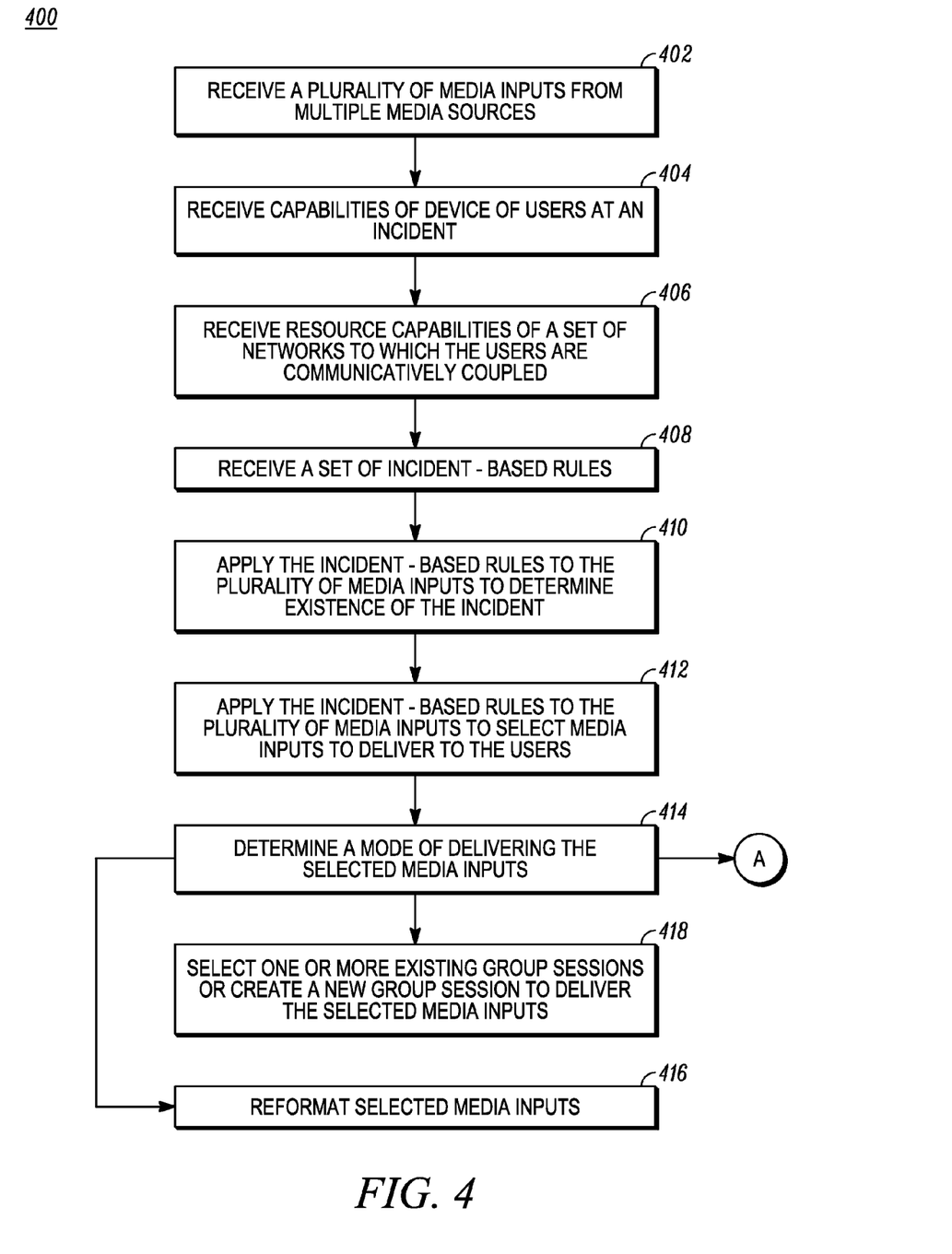
FIG. 4 illustrates a flow diagram of a method for selecting and delivering media inputs to users at an incident in accordance with some embodiments.
Figure 5:
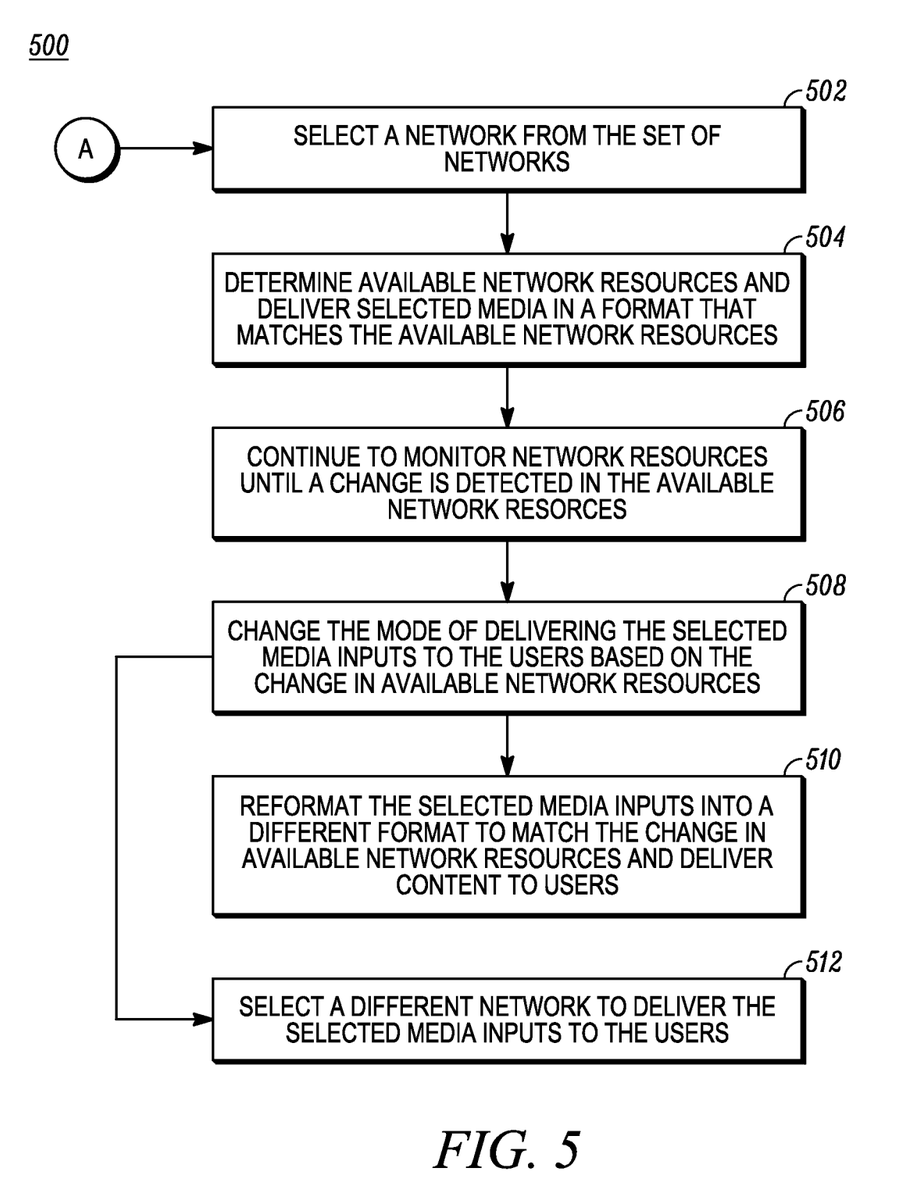
FIG. 5 illustrates a flow diagram of a method for determining a mode of delivering selected media inputs to users at an incident in accordance with some embodiments.
Figure 6:
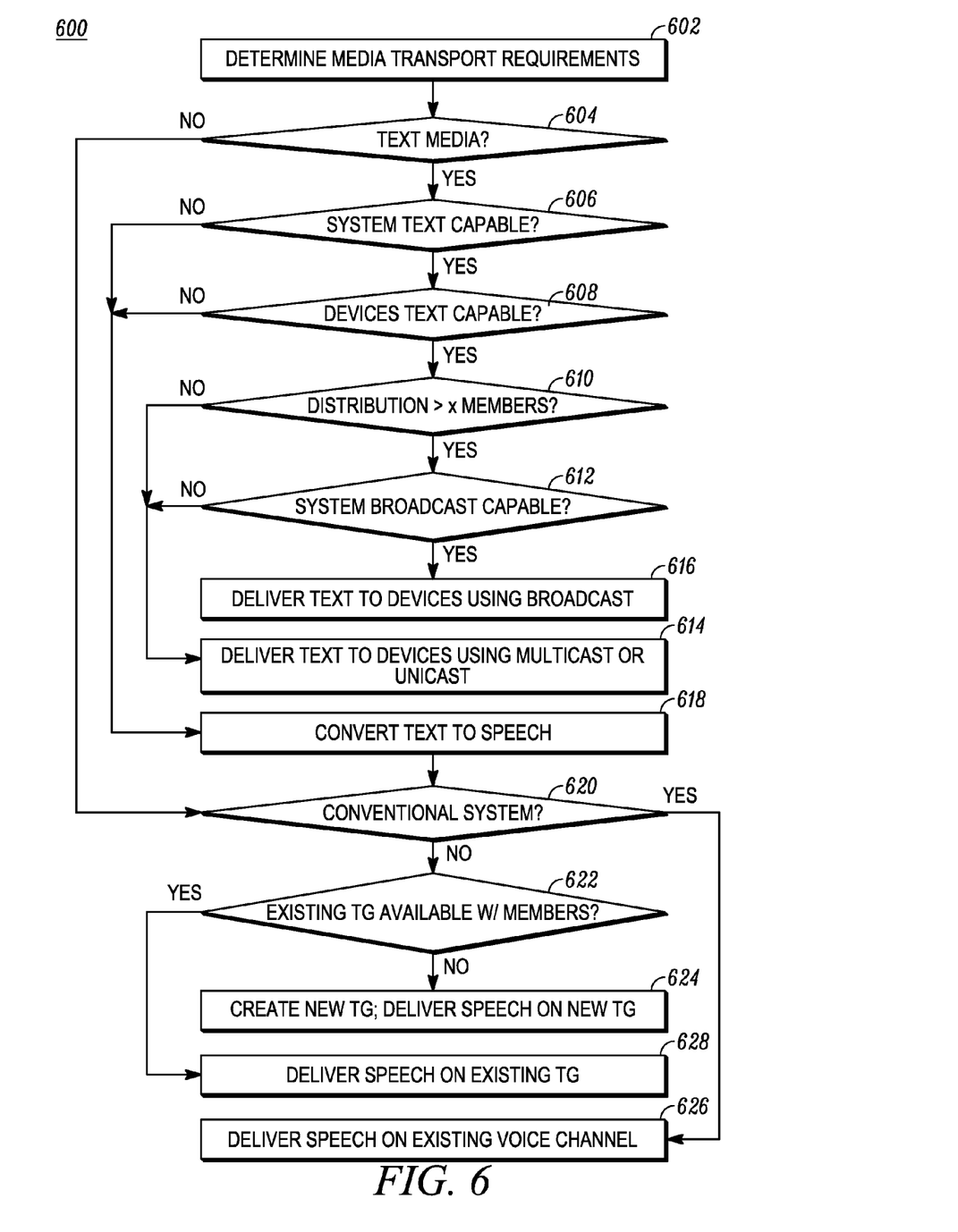
FIG. 6 illustrates a flow diagram of a method for determining a format for selected media inputs for delivery to users at an incident in accordance with some embodiments.

The media selection and insertion control function 202 interacts with all of the other functions shown in FIG. 2 for implementing various embodiments of the disclosure. FIG. 4 and FIG. 5 illustrate methods showing some general functionality performed by the media selection and insertion control function 202 (in some instances in conjunction with other functional blocks) for selecting and distributing media to users at an incident. FIG. 6 illustrates an example algorithm performed by the media selection and insertion control function 202 in conjunction with other functional blocks for some of the more specific functions that enable the selection of appropriate resources (e.g., media inputs, network, group session, etc.) and formatting of the selected media inputs for distribution to the first responders. Methods 400 to 600 include functionality that may be performed in hardware, firmware, software or a combination thereof and may further be performed at a single hardware device or a combination of hardware devices in a system. Also, one or more steps of methods 400 to 600 can be performed at supporting hardware units external to the system. In the described illustrative embodiment, much of the functionality of methods 400 to 600 is performed in the controller system 160 (more particularly in the media selection and insertion control function 202 and the media insertion control/queuing function 206) with some supporting functionality being performed in other systems such as the CAD system 150, the networks 192, 194, 196, and the call control system 190.

With respect to method 400 shown in FIG. 4, in general, the media selection and insertion control function 202 receives a number of inputs to enable it to perform its functionality. More particularly, the media selection and insertion control function 202 receives (402), from the analysis functions 212, a plurality of media inputs (e.g., sensor inputs, video inputs, data inputs, audio inputs, and metadata associated with those inputs such as detection of gunshot, leak, explosion, etc.). It further receives (404 and 406), e.g., from the PTX control function 208, information regarding the users groups and devices that are active, the location of users, device capabilities or resources (e.g., video capable and codec rate, audio only, data capable, networks supported), transport characteristics for the group (e.g., multicast or broadcast capable), users and entities comprising the groups, network resource capabilities (e.g., available bandwidth, multicast/broadcast capable, supports data, video, voice, individually or in some combination) of the set of one or more networks (e.g., 192, 194, 196) to which the users are connected.

Moreover, the media selection and insertion control function 202 receives (308) a set of incident-based rules that may be pre-configured, pre-stored or preprogrammed, manually received, e.g., from a CAD operator, manually created and input as the incident occurs, or likely a combination thereof, that it applies (410, 412) to the received media inputs to optionally determine (if this has not already been done by some other function or user at the scene) that an incident exists for which media will be needed to respond to the incident, and if such an incident is determined to exist, it will trigger the selection (412) of media inputs to deliver to the responders at the scene. The incident-based rules, in one implementation, are created by the agencies called to the scene, and include preferences for managing multiple input sources as well as external factors such as incident type, environmental factors, date/time of day, weather, major events, etc. The incident-based rules further specify combinations of inputs to evaluate to determine whether an incident exists (e.g., analyzing video input and determining existence of the incident based on the contents of the video input and triggering a voice announcement of the contents of the video), and can also specify language to use for voice messaging (e.g., language type, words needed to be broadcast, phrases, etc.).

As mentioned earlier, the determination of the existence of the incident and thus the trigger for selecting certain media inputs to push to the responders can be made by the media selection and insertion control function 202 applying the incident-based rules to the inputs that it receives from the analysis blocks 212. This is termed a "proactive" initiation or triggering for pushing incident information to the responders. In this proactive model, a policy driven decision is made to deliver specified media to responders. This may be driven by agency policy or policy determined by the type of incident or some combination of both. In an illustrative proactive model, input sources have pre-determined thresholds that, when exceeded, automatically trigger the selection and sending of the incident-related information.

A second model for triggering the selection and distribution of media inputs in accordance with the teachings herein is termed a "reactive" model. According to this approach, initiation or triggering for pushing incident information to the responders is performed in response to manual commands (e.g., voice instruction), which may be dispatch initiated or field responder initiated (for instance by selecting a menu option for delivering certain media, querying sensors, or requesting various other types of information), which can be dynamically created or updated.

Once, the media inputs from analysis blocks 212 are correlated and analyzed against the incident-based rules to select a situation relevant set of the media inputs for distribution, the media selection and insertion control function 202 operates in connection with the media collection and conversion function 204, the media insertion control/queuing function 206, and the PTX control function 208 to determine (414) an optimal mode of delivering the selected media inputs to the responders based on a minimum of the capabilities of the responders' devices and on the resource capabilities of the networks to which the responders are connected. Other factors for determining the mode of delivering the selected content may include priority of the media communication and priority of the responders receiving the media content.

In general, in determining the mode of delivering the selected media input, three major factors are analyzed: whether any if the media inputs should be reformatted (416) (also referred to herein as media conversion); selection (418) of a group session, either existing or newly created, in which to deliver the selected media contents; and selection (FIG. 5, 502) of one or more networks for use in delivering the selected media content. We turn first to media conversion, wherein the selected media inputs are adapted to the users' devices. Thus, determining the mode of delivering the selected media inputs may include reformatting at least one of the selected media inputs to match the capabilities of the device of at least one of the responders or reformatting one or more of the selected inputs to match one or more of the networks to which the responders' devices are connected. Such reformatting may take on many different forms, some examples of which follow.

For example, all or most of the users' devices (especially key users' devices) may be compatible with voice. Therefore, one or more media inputs may be converted to voice. Particular examples include: when the selected media input is data (e.g., text messaging, sensor input), converting the text to audio (e.g., one or more voice messages or packets) for insertion into a voice session (e.g., a P25 session); when the selected media input is an image, converting the image to text, and converting the text to audio (e.g., a voice announcement) for insertion into a voice session; and when the selected input is video (e.g., video stream, video clip), converting the video into audio (e.g., a voice announcement) for insertion into a voice session, or converting the video images to text, and converting the text to audio for insertion into a voice session.

In addition, audio (e.g., audio from video) might be converted to text and broadcast or multicast to responders. Also, the bit rate of the selected media content might be changed to match users' devices and/or network transport capabilities. For instance, in one implementation, at least one of the selected media inputs is upconverted from one bit rate format to a higher bit rate format for delivery to the users. In another implementation, at least one of the selected media inputs is downconverted from one bit rate format to a lower bit rate format for delivery to the users. In addition, the format of selected media inputs can be changed to match a display screen size (for displaying images or video) or to match text, video, and/or codec capabilities of a user's device, etc., in the case where the selected input for distribution is a video input. Moreover, the capabilities of group sessions in the system (e.g., voice, video, multicast, etc.) can be determined, and the selected media input reformatted to match those capabilities. For example, if recipients are numerous and broadcast SMS (Short Messaging Service) is not available, a selected text input can be transcoded to match an available multicast-capable voice group.

The media selection and insertion control function 202 indicates to the media collection and conversion function 204, the selected media inputs for distribution (which input flows to select), the media format, conversion instructions, and an indication of when to forward the media to the media insertion/control queuing function 206. Based on these inputs, the media collection and conversion function 204 selects the appropriate media inputs from the analysis blocks 212, if necessary converts the media into the desired format and stores and/or, forwards the formatted selected media to the media insertion/control queuing function 206.

In this illustrative implementation, the media selection and insertion control function 202 further provides to the media insertion control/queuing function 206, data needed to determine how (e.g., which networks, media sessions) and when to push the formatted media to the users. In one embodiment, the media insertion control/queuing function 206 is provided information including, but not limited to: existing group sessions in the system and the capabilities of these groups; the number of users in the distribution groups; the network service capabilities (e.g., capable of supporting telephony, data, PTT, SMS, video, etc.) network transport capabilities (e.g., unicast vs. broadcast or multicast, throughput, over the air congestion, latency, signal strength, backhaul availability, congestion state, capacity or core network bandwidth availability, etc.); system type (e.g., conventional, PTT, etc.); priority of the media and/or the users in the distribution group; and "canned" voice phrases to be inserted.

Using this information, the media insertion control/queuing function 206 determines available network resources and selects one or more available networks (FIG. 5, 502, 504) and selects or creates one or more group sessions and coordinates with the PTX control function 208 to send the situation relevant media to the users in those group sessions. More particularly, regarding determining how to insert the relevant media into a group session, the media insertion control/queuing function 206, in general, analyzes the users in the distribution group (including their priority), and if there's a good match with an existing group session (e.g., where group 120 contains at least the desired recipients), the existing session is used for the media distribution. Otherwise, a new temporary group session is created (e.g., group 111 established via session signaling between functions 206 and 208) for the media distribution, which is supported by the network and device resources.

Regarding determining when the situation relevant media is provided to the users, the information can be sent via preemption (by interrupting other media being exchanged during the session or excluding one or more users in the session from receiving the media content based on the users' priority if the group has a high utilization); or during a "silence" period in the group session when no other media is being exchanged. And the timing of the sending can be based on priority. For instance, there can be a check for priority, selection of sending high priority information or text first to an important commander and then sending information to the group in general; images may be inserted first and then higher quality video later.

Any suitable algorithms can be used for determining the format of selected media inputs for selecting appropriate networks and groups for distributing the selected media content. FIG. 6 provides such example an algorithm 600. Other such algorithms can be envisioned and are included within the scope of the teachings herein. In FIG. 6, at 602, the media selection and insertion control function 202 determines the transport requirements for the selected inputs, for instance based on the device and network capabilities. For example, if (604) the media is text and (606, 608) the selected network is text capable as well as the users' devices, the media is delivered (616) as text to the users via broadcast if (610, 612) the number of users in the distribution list exceeds a threshold "x", and the network is broadcast capable. If the number of users in the distribution is less than the threshold "x" or the network is not broadcast capable, the text is distributed to the users via multicast or unicast links (614).

However, if the media is text and either the selected network (606) or the users' devices (608) are not text capable, the text is converted (618) to audio. If the selected network is a conventional network, the audio is delivered on an existing voice channel. Otherwise, the existing talkgroups are reviewed (622), and if a compatible talkgroup already exists, the media is delivered (628) into the existing talkgroup. Otherwise, a new talkgroup is created (624) for delivering the selected media content.

As the incident unfolds over time, the media selection and insertion control function 202 continues to monitor (506) the available network resources for the selected network(s). When a change (508) in network resources is detected, functions 202 and 204 collaboratively change the mode of delivering the selected media inputs based on the change in available network resources of the selected network(s). This change in the mode of delivery may comprise reformatting (510) certain of the media content from one format to a different format due to a change in available network resources (e.g., changing video to voice or text due to a decrease in available bandwidth, or vice versa) and delivering the reformatted media to the groups consistent with the capabilities of the users. The change in the mode of delivery may comprise selecting (512) a completely different network to deliver the situation relevant media to the groups. A change in communication priority may further contribute to a change in the mode of delivering the selected media.

Finally, an example use case may aid in the understanding of the disclosed teachings. In one illustrative implementation, a video stream is analyzed (by functions 212) and detects a person running from a store; and within the audio portion of the video stream, a gunshot is detected. Also, a white vehicle with license plate JM 2407 is determined to have driven by the incident scene shortly before the gunshot was detected, and an alarm at the store is triggered. The video stream, and the associated meta data (e.g., a person running from the store, a gunshot detection, and the license plate number, description of the vehicle, the alarm sensor going off) is provided as inputs to the media selection and insertion control function 202, which applies incident-based rules to these inputs and determines that an incident exists and provides this information to the CAD system 150. The CAD system dispatches police to the scene.

As the first responders are closing in on the incident scene, analysis functions 212 further determine from the video input that the vehicle detected belongs to a person with an outstanding warrant; and facial recognition of the person running in the video determines that they are affiliated with the same gang as the person who owns the vehicle. The media selection and insertion control function 202 applies the incident-based rules (e.g., police agency rules) to the media inputs from functions 212 and reviews the responders' device capabilities and the available network capabilities and determines that the incident commander should be provided the video feed first, and all of the responders can be provided metadata based on the inputs, which includes a description of the vehicle fleeing the scene and the license plate number of the vehicle, as well as the identification and gang affiliation of the person fleeing the scene and the owner of the vehicle. The functions 202 and 204 decide to format this metadata in a text message to some responders whose devices have text capabilities and also to send a text to voice conversion of this message to existing voice talkgroups. As can be readily seen, especially in view of the above use case, embodiments of the teachings herein can be used to provide timely and situation relevant media to first responders, which incorporates factors including, but not limited to, the type of situation, as well as the availability of different types of media needing to be delivered and the devices and networks utilized by the first responders.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for selecting media for delivery to a plurality of users, the method comprising:
a controller performing:
receiving a plurality of media inputs from multiple media sources;
receiving capabilities of devices of a plurality of users at an incident, wherein the capabilities of a device comprises the device being video capable, audio only, or data capable;
receiving resource capabilities of a set of networks to which the users are communicatively coupled, wherein the resource capabilities comprises available bandwidth and multicast/broadcast capable;
receiving a set of police emergency and/or fire emergency-based rules;
applying the set of police emergency and/or the fire emergency-based rules to determine the existence of the incident; and
applying the set of police emergency and/or fire emergency based-rules to the plurality of media inputs for selecting media inputs to deliver to at least some of the users, wherein selecting the media inputs to deliver to the at least some of the users is based on a minimum of the capabilities of users' devices and on the resource capabilities of the set of networks to which the users are communicatively coupled;
receiving an indication of a set of existing group sessions having as participants at least some of the users at the police emergency and/or fire emergency;
determining a mode of delivering the selected media inputs to the users' devices, wherein determining the mode of delivering the selected media inputs comprises at least one of selecting one or more of the existing group sessions or creating a new group session to deliver the selected media inputs to the users;
monitoring network resources until a change is detected in available network resources;
changing the mode of delivering the selected media inputs to the users based on the change in the available network resources;
reformatting the selected media inputs into a different format to match the capabilities of the device of at least one of the users; and
wherein reformatting the selected media inputs comprising the step of converting an image to text, converting text to audio for insertion into a voice session; or converting video into audio for insertion into a voice session.

2. The method of claim 1 further comprising:
applying the police emergency and/or fire emergency-based rules to the plurality of media inputs to determine existence of the police emergency and/or fire emergency, wherein determining the existence of the police emergency and/or fire emergency triggers the application of the set of police emergency and/or fire emergency-based rules to the plurality of media inputs to select the media inputs to deliver to the users.

3. The method of claim 1, wherein the mode of delivering the selected media inputs to the users is further determined based on priority of communications for each of the users.

4. The method of claim 1, wherein at least one of the selected media inputs is reformatted to match the resource capabilities of at least one network in the set of networks.

5. The method of claim 1, wherein one of the selected media inputs comprises a sensor input, and wherein reformatting at least one of the selected media inputs comprises reformatting the sensor input for insertion into a voice message.

6. The method of claim 1, wherein reformatting at least one of the selected media inputs comprises downconverting the selected media input for delivery to the users.

7. The method of claim 1, wherein reformatting at least one of the selected media inputs comprises upconverting the selected media input to the users.

8. The method of claim 1, wherein one of the selected media inputs comprises a video input, the method further comprising analyzing the video input and determining existence of the police emergency and/or fire emergency based on contents of the video input, and wherein reformatting at least one of the selected inputs comprises reformatting at least some of the contents of the video input to generate a voice announcement to the users at the police emergency and/or fire emergency.

9. The method of claim 1, wherein one of the selected media inputs comprises a data input, and wherein reformatting at least one of the selected media inputs comprises reformatting the data input for insertion into a voice message.

10. The method of claim 1, wherein one of the selected media inputs comprises an audio input, and wherein reformatting at least one of the selected media inputs comprises reformatting the audio input for insertion into a text message.

11. The method of claim 1, wherein at least some of the users are included in one or more work groups assigned to the police emergency and/or fire emergency.

12. The method of claim 1 further comprising:
determining capabilities of each selected or created group session; and
reformatting at least one of the selected media inputs to match the capabilities of one or more of the selected or created group sessions.

13. The method of claim 1, wherein determining the mode of delivering the selected media inputs comprises:
selecting a network from the set of networks to use in delivering the selected media inputs to the users;
determining available network resources for the selected network based on the received resource capabilities of the set of networks, and delivering the selected media inputs to the users in a first format that matches the available network resources;
monitoring the available network resources for the selected network after delivering the selected media inputs in the first format for a time period, and detecting a change in available network resources of the selected network; and
changing the mode of delivering the selected media inputs to the users based on the change in available network resources of the selected network.

14. The method of claim 13, wherein changing the mode of delivering the selected media inputs comprises reformatting the selected media inputs to a second format to match the change in available network resources of the selected network, and delivering the selected media inputs to the users in the second format.

15. The method of claim 13, wherein changing the mode of delivering the selected media inputs comprises selecting a different network of the set of networks to deliver the selected media inputs to the users.

\* \* \* \* \*

UNITED STATES PATENT AND TRADEMARK OFFICE
CERTIFICATE OF CORRECTION

PATENT NO.       : 8,862,173 B2
APPLICATION NO.  : 12/635281
DATED            : October 14, 2014
INVENTOR(S)      : James A. Marocchi et al.

Page 1 of 1

It is certified that error appears in the above-identified patent and that said Letters Patent is hereby corrected as shown below:

IN THE CLAIMS:

In Column 14, Line 12, in Claim 1, delete "comprises" and insert -- comprise --, therefor.

Signed and Sealed this
Tenth Day of May, 2016

Michelle K. Lee
*Director of the United States Patent and Trademark Office*